United States Patent [19]

Peltier

[11] 4,430,307

[45] Feb. 7, 1984

[54] METHOD FOR SEPARATING THE ISOTOPES OF AN ELEMENT IN PARTICULAR OF A METAL HAVING A HIGH ATOMIC WEIGHT

[76] Inventor: Raymond Peltier, 11 Square Jasmin, 75016 Paris, France

[21] Appl. No.: 159,225

[22] PCT Filed: Jun. 30, 1978

[86] PCT No.: PCT/EP78/00003

§ 371 Date: Feb. 28, 1979

§ 102(e) Date: Feb. 28, 1979

[87] PCT Pub. No.: WO79/00025

PCT Pub. Date: Jan. 25, 1979

[30] Foreign Application Priority Data

Jul. 4, 1977 [FR] France .................................. 77 20491

[51] Int. Cl.³ .......................... B03D 1/00; B03D 1/02; B03D 1/06; C01G 56/00
[52] U.S. Cl. ......................................... 423/3; 209/166; 423/258
[58] Field of Search ..................... 423/3, 258; 209/166

[56] References Cited

U.S. PATENT DOCUMENTS 3,058,811 10/1962 Shay .
3,551,329 7/1966 Lange et al. .
3,697,235 10/1972 Ogle ......................................... 423/3
3,794,716 2/1974 Ogle ..................................... 423/258
4,024,217 5/1977 Wexler et al. ......................... 423/258

FOREIGN PATENT DOCUMENTS 167911 5/1953 Australia .
228907 8/1958 Australia .
589788 12/1959 Canada .
589791 12/1959 Canada .
45-6759 3/1970 Japan .
1074710 7/1967 United Kingdom .................... 423/3

OTHER PUBLICATIONS

Chemical Abstracts, 62: 154, 364 b-c, 1965.
"Flotation" by A. M. Gaudin (2nd ed.)., McGraw-Hill, 1957 p. 485.

*Primary Examiner*—Allan Lieberman
*Attorney, Agent, or Firm*—Schwartz, Jeffery, Schwaab, Mack, Blumenthal & Koch

[57] ABSTRACT

The invention relates to a process and apparatus for the separation of the isotopes of a body, and particularly of a heavy metal. The process comprises the preparation of a tension-active compound of said body, the solution of this compound in a liquid having a strong surface tension, the injection of a non-miscible body into this solution to form a plurality of separation surfaces, and the recovery of the fraction of the solution adjacent to said separation surfaces. The apparatus comprises a plurality of vats, means for injecting a gas into these vats to produce a foam, means to collect the foam and transfer it into a vat downstream, and means to transfer a portion of the liquid from one vat into another vat located upstream thereof. The process and apparatus are applied to the isotopic separation of uranium.

8 Claims, 1 Drawing Figure

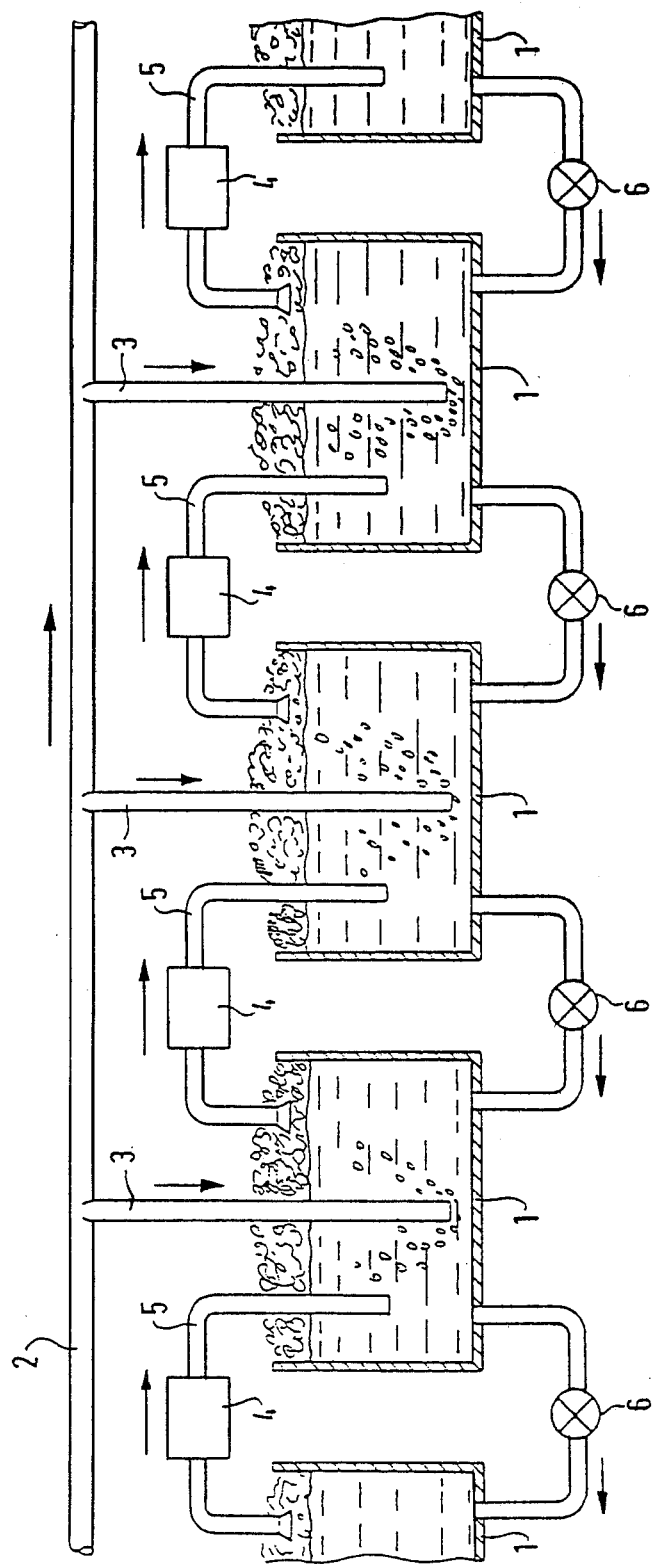

METHOD FOR SEPARATING THE ISOTOPES OF AN ELEMENT IN PARTICULAR OF A METAL HAVING A HIGH ATOMIC WEIGHT

The present invention relates to a process for the separation of the isotopes from a body, particularly from a heavy metal, and to an apparatus for carrying out the process.

At the present time there are two known processes utilized for producing such a separation, based on the difference of mass between the molecules of the same chemical compound of several isotopes of the same body, the centrifugation, and the gaseous diffusion. The process that is utilized the most, the gaseous diffusion, requires complex equipment. Furthermore, when it is utilized for the separation of the isotopes 235 and 238 of uranium, it is carried out with uranium tetrafluoride, an extremely active compound from the chemical view point and thus difficult to handle.

It is an object of the present invention to eliminate these disadvantages. For this purpose the process of the invention comprises the formation of a tension-active compound of this body, the dissolution of this compound in a liquid having a strong surface tension, the injection of a non-miscible body into this solution to form a plurality of separation surfaces, and the recovery of the fraction of the solution which is adjacent to the mentioned separation surfaces.

It is indeed known that the tension-active force which attracts the molecules of a tension-active body dissolved in a liquid toward a separation surface formed in this liquid, is similar to the capillary tension. This force is due to the action of the surrounding molecules, here the molecules of the liquid having a strong surface tension, on the molecule considered, an action carried out by attraction or repulsion forces at a short distance. This action, which is necessarily balanced in the bulk mass of the solution and has therefore a zero resultant, is unbalanced at the vicinity of the separation surfaces, precisely because of the fact that there are, beyond this separation surface, different molecules, and thus different attraction or repulsion forces. This action has therefore, in the vicinity of the separation surface, a resultant which is non zero. For reasons of symmetry it is furthermore normal to this surface.

This action is carried out on the molecules of the liquid as well as on the molecules of the tension-active compound, but it is stronger on the molecules of the tension-active compound than on the molecules of the liquid, and the former tend to take the place of the latter on the separation surfaces. It will be shown furthermore that the capillary energy of the system is equal to the product of the area of the separation surface and the surface tension of the molecules which cover it. This tends to be a minimum energy which explains on the one hand why the non-miscible body, when it is a fluid, presents itself in the form of drops or bubbles of spherical shape so as to minimize the surface, and on the other hand why the molecules of the tension-active compound tend to take the place of the molecules of the liquid having a strong surface tension.

This is all happening as if the molecules of the tension-active compound were attracted by the separation surface. This attraction force is the same for all the molecules of the compound, whichever be the isotope of the body having served to form it, because it is a force which has a chemical origin. This force of attraction is inversely proportional to a power n of the distance to the separation surface. In a first approximation one can estimate that n is equal to 2.

All the molecules of the tension-active compound are thus attracted toward the separation surface by an identical force which is only the function of the distance, but these molecules do not all have the same mass, because those which contain the lightest isotope of the body of which one wants to perform the isotopic separation are in all evidence lighter than the molecules containing the heaviest isotope. It will thus be understood that the molecules containing the lightest isotope have a greater acceleration than the molecules containing the heaviest isotope, having less inertia than the latter. They are therefore faster and arrive first at the separation surface. This separation surface is thus richer in lighten isotopes than the initial solution.

It is preferred to blow a gas into the solution in order to produce bubbles therein and to form thus the separation surfaces.

Accordingly the molecules of the tension-active compound tend to locate themselves at the surface of the bubbles, normally to this surface, and the migration does not stop until the entire surface of the bubbles is covered by a mono-molecular layer of the tension-active compound. But the non-miscible body can be also another fluid, or even a powdery solid having a large specific surface, such as fine sand.

In a preferred embodiment of the invention the tension-active compound is a soap and the bubbles are collected at the free surface of the solution in the form of a foam.

In fact when the gas bubble which, due to its lightness, ascends in this liquid having a strong surface tension, arrives at the surface, it keeps its pseudo-membrane of the tension-active compound, and takes the well known shape of a soap bubble to form thus a foam. The membrane which surrounds each bubble is constituted of molecules of the liquid, and particularly of molecules of soap.

In actual practice the fraction of the recovered solution is again dissolved in a liquid having a strong surface tension and the succession of the operations is repeated many times. In fact the relative difference of mass between two molecules of the tension-active compound, comprising two different isotopes of the body whose isotopic separation is to be produced, is generally small. This is true even more so as it concerns a heavy body.

The concentration of the lightest isotope, of the fraction of the solution recovered, is thus only slightly greater than the concentration of the starting solution. It is thus necessary to repeat the procedure until one obtains the desired concentration.

The fraction of the solution which is not recovered is preferably recycled, the formation of the separation surface and the recovery of the fraction of the solution adjacent to the surface being again carried out.

It will be observed that the fraction of the solution which is not recovered has a concentration of lightest isotope which is smaller than the concentration of the starting solution. One produces thus a continuous isotopic separation, the solution which has been weakened being enriched again. Furthermore this procedure can be easily automated.

The mentioned tension-active compound is preferably an oleate.

It will be understood that other soaps can be used, as they are bodies that can be easily prepared industrially and present no danger, neither for man nor for the material which does therefore not risk being affected. It will be noted in this respect that in the case of the isotopic separation of uranium the uranium oleate is much easier to handle than the uranium tetrafluoride which is presently utilized in the gaseous diiffusion process.

On the other hand there is interest in reducing the molecular weight of the fatty acid utilized for the manufacture of the soap in order to increase the relative difference between the masses of the molecules of two different isotopes.

The mentioned gas is preferably air.

The liquid having a strong surface tension can be water, but other liquids are suitable, particularly hydrocarbons.

The invention will be described hereafter in greater detail as applied to the separation of the isotopes 235 and 238 of uranium.

Starting with a mixture of uranium 235 and 238 the uranium oleate is produced. It is possible to start for example with natural uranium containing 0.7% uranium 235. The molecules which contain the isotope 235 of uranium have a mass which is proportional to $M+235$, where M is the molecular weight of the oleate, uranium excluded, while those which contain the isotope 238 have a mass which is proportional to $M+238$.

This oleate is then dissolved in water and air is injected into the solution in order to produce bubbles.

It will be shown that if $x_o$ is the initial distance to the surface of a bubble of a molecule of uranium oleate of a mass m, the time T required by the molecules to reach the surface is $$T = \frac{\pi}{2} \sqrt{\frac{m}{2a} \cdot x_o} \cdot \frac{3}{2}$$

where a is a constant coefficient.

The molecules of isotope 235 will arrive at the surface of the bubble relatively faster than those of the isotope 238, the travel times for a first initial distance being in the relationship $$\sqrt{\frac{M+235}{M+238}}$$

One can deduce from the above results that if $\alpha_0$ is the initial concentration of uranium 235 in relation to the total uranium, and $\alpha_1$ this concentration in the soap bubble, $$\alpha_1 = \frac{\alpha_0 \lambda}{1 + \alpha_0(\lambda - 1)} \text{ with } \lambda = \sqrt[3]{\frac{M+238}{M+235}}$$

or very nearly the same, if the concentrations remain weak, $$\alpha_1 = \alpha_0 \lambda.$$

The bubbles are then collected in the form of surface foam and again dissolved in water. If the operation is repeated n times, the concentration of uranium 235 in the foam relative to the total uranium is then $$\alpha_n = \alpha_o \cdot \left[ \frac{M+238}{M+235} \right]^{\frac{n}{3}}$$

in the case where the concentrations remain weak.

If the concentration is strong, one has then:

$$\alpha_n = \frac{\lambda \cdot \alpha_n - 1}{1 + (\lambda - 1) \cdot \alpha_{n-1}}$$

One will obtain thus, for example in the case where the fatty acid which has served for the manufacture of the soap is such that $M=200$, and for $\alpha_0=0.00700$:
$\alpha_1 = 0.00702$
$\alpha_{100} = 0.00880$
$\alpha_{200} = 0.01107$
$\alpha_{300} = 0.01392$
$\alpha_{500} = 0.02200$
$\alpha_{1000} = 0.06920$
$\alpha_{1500} = 0.21750$ Accordingly we can obtain after a sufficiently large number of operations strong concentrations of uranium 235.

The present invention also concerns an apparatus for carrying out the above mentioned process.

According to the invention this apparatus comprises a plurality of vats, means for injecting a gas into these vats, means for collecting a foam formed at the surface of the liquids contained in the vats and to transfer it into a vat situated below the one where it was collected, and means for transferring a portion of the liquid contained in each vat into a vat situated above the latter.

An embodiment of such an apparatus is illustrated in the attached FIG. 1 as a non-limiting example.

The apparatus comprises a plurality of vats 1 and a conduit 2 for introducing air under pressure. The conduits 3 are branched off the conduit 2 and the air can be injected into the vats 1.

If the vats 1 contain uranium oleate in solution in water, the air injected by the conduits 3 forms at the surface of the vats a foam of uranium oleate which, as has been explained above, is richer in uranium 235 relative to the uranium 238 than the solution contained in the vat.

The apparatus comprises also means 4 which are adapted to collect the foam which is formed at the surface of the vats and to redissolve this form in a vat that is situated downstream. These means can comprise for example a scraper for gathering foam, means for reducing this foam to the liquid state, and a conduit 5 for transferring and dissolving this liquid in the vat located directly downstream of the vat where the foam has been removed.

Finally, the apparatus comprises pumps 6 for transferring the solution contained in each vat to a vat situated upstream of the latter.

Thus the uranium 235 is concentrated in the vats situated downstream while the solutions contained in the vats and which are weakened in uranium 235 after the formation of foam are transferred upstream. Preferably control systems are provided which permit to maintain the concentration of uranium 235 in each vat substantially constant.

In the case where the nonmiscible body utilized is a powdery solid the process is substantially different. In that case it is in fact necessary to extract this solid after it was dipped into the vat, and to wash it with an appropriate solvent in order to recover the fraction of the solution adjacent to the separation surfaces.

It will be understood that the invention is not limited to the embodiment described above merely as an example, but that its scope extends to all possible modifications of these embodiments.

I claim:

1. A process for the separation of isotopes from a heavy metal comprising forming a tension active compound of said metal with a soap, dissolving said compound in a liquid having a strong surface tension, injecting a non-miscible body into the solution of said compound in said liquid and thereby forming a plurality of separation surfaces, and recovering the fraction of the solution adjacent said separation surfaces enriched in the lighter isotope.

2. A process as in claim 1 and wherein said non-miscible body comprises a gas, and injecting said gas so as to form bubbles as said separation surfaces.

3. A process as in claim 2 and including collecting said bubbles at the surface of said solution in the form of a foam.

4. A process as in claim 1 and including redissolving the recovered fraction of the solution in a liquid having a strong surface tension and repeating said injecting and recovering steps.

5. A process as in claim 1 or 4 and including recycling the fraction of the solution remaining after the recovery step and repeating said injecting and recovering steps.

6. A process as in claim 1 and wherein said tension active compound is an oleate.

7. A process as in claim 1 and wherein said heavy metal is uranium.

8. A process as in claim 2 and wherein said gas is air.

* * * * *